(12) United States Patent
Chen et al.

(10) Patent No.: US 8,646,818 B2
(45) Date of Patent: Feb. 11, 2014

(54) LOCKING DEVICE FOR CASE OF PORTABLE ELECTRONIC DEVICE

(75) Inventors: Jung-Pin Chen, Kaohsiung (TW); Shu-Chen Lin, Kaohsiung (TW); Shan-Yao Chen, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 264 days.

(21) Appl. No.: 13/304,447

(22) Filed: Nov. 25, 2011

(65) Prior Publication Data
US 2013/0134721 A1   May 30, 2013

(51) Int. Cl.
*E05C 3/06* (2006.01)
*E05C 3/16* (2006.01)
*E05C 3/02* (2006.01)

(52) U.S. Cl.
USPC .................. 292/216; 292/194; 292/DIG. 11; 292/DIG. 12; 455/575.1; 455/347

(58) Field of Classification Search
USPC ......... 292/1, 3, 194, 213, 214, 216, 219, 300, 292/DIG. 11, DIG. 12, DIG. 34; 455/90.3; 361/679.57, 679.58
See application file for complete search history.

(56) References Cited

U.S. PATENT DOCUMENTS

| | | | |
|---|---|---|---|
| 2,889,609 A * | 6/1959 | Eisenhard et al. ................. | 27/17 |
| 4,365,490 A * | 12/1982 | Manzoni .......................... | 70/70 |
| 5,469,982 A | 11/1995 | Gordecki et al. | |
| 5,946,395 A | 8/1999 | Petrella et al. | |
| 6,517,129 B1 * | 2/2003 | Chien et al. ................. | 292/251.5 |
| 7,072,624 B2 | 7/2006 | Zheng et al. | |
| 7,116,780 B2 | 10/2006 | Sun | |
| 7,139,167 B2 * | 11/2006 | Yang ......................... | 361/679.57 |
| 7,149,306 B2 | 12/2006 | Pan | |
| 7,333,777 B2 | 2/2008 | Qin et al. | |
| 7,515,404 B2 * | 4/2009 | Zhang et al. .............. | 361/679.27 |
| 7,637,540 B2 * | 12/2009 | Chiang .......................... | 292/45 |
| 8,085,533 B2 * | 12/2011 | Zhao et al. ............... | 361/679.58 |
| 8,267,464 B2 * | 9/2012 | Konchan et al. ........... | 296/146.6 |
| 8,513,522 B2 * | 8/2013 | Liang .............................. | 174/66 |
| 2003/0128506 A1 * | 7/2003 | Won et al. ...................... | 361/686 |
| 2003/0219117 A1 | 11/2003 | Sun | |
| 2005/0185370 A1 * | 8/2005 | Chung .......................... | 361/683 |
| 2006/0002062 A1 * | 1/2006 | Kwon et al. .................. | 361/680 |
| 2006/0133025 A1 * | 6/2006 | Wu et al. ........................ | 361/683 |
| 2007/0120372 A1 * | 5/2007 | Zhang et al. ...................... | 292/8 |
| 2007/0120373 A1 * | 5/2007 | Zhang et al. ..................... | 292/42 |
| 2007/0217140 A1 * | 9/2007 | Chen et al. ..................... | 361/683 |
| 2009/0108593 A1 * | 4/2009 | Lee ............................... | 292/164 |

(Continued)

*Primary Examiner* — Kristina R Fulton
*Assistant Examiner* — Faria Ahmad
(74) *Attorney, Agent, or Firm* — Rosenberg, Klein & Lee

(57) ABSTRACT

A locking device includes a body, a first part, an engaging assembly, a link and a locking member. The body has an installation area and the engaging assembly is installed in the installation area and includes a first engaging member and a first resilient member which provides a force to the first engaging member to connect the engaging member to the first part. The link is movably located in the installation area to push the first engaging member to move relative to the first part to release the locked status. The locking member is located in the installation area and has a first recess and an operation end. When the first recess is located corresponding to the first engaging member, the first engaging member is movable in the first recess. When the first recess is located away from the first engaging member, the first part is secured to the body.

10 Claims, 10 Drawing Sheets

(56) References Cited

U.S. PATENT DOCUMENTS

| | | |
|---|---|---|
| 2009/0115197 A1* | 5/2009 | Grunow et al. ............... 292/102 |
| 2009/0140531 A1* | 6/2009 | Lee ................................ 292/99 |
| 2009/0163842 A1* | 6/2009 | Cropper .......................... 602/26 |
| 2009/0184525 A1* | 7/2009 | Tseng ........................... 292/300 |
| 2010/0103600 A1 | 4/2010 | Chen et al. |
| 2010/0317414 A1 | 12/2010 | Chen et al. |
| 2012/0170182 A1* | 7/2012 | Liu et al. .................. 361/679.01 |
| 2012/0230763 A1* | 9/2012 | Chen et al. .................... 403/350 |

* cited by examiner

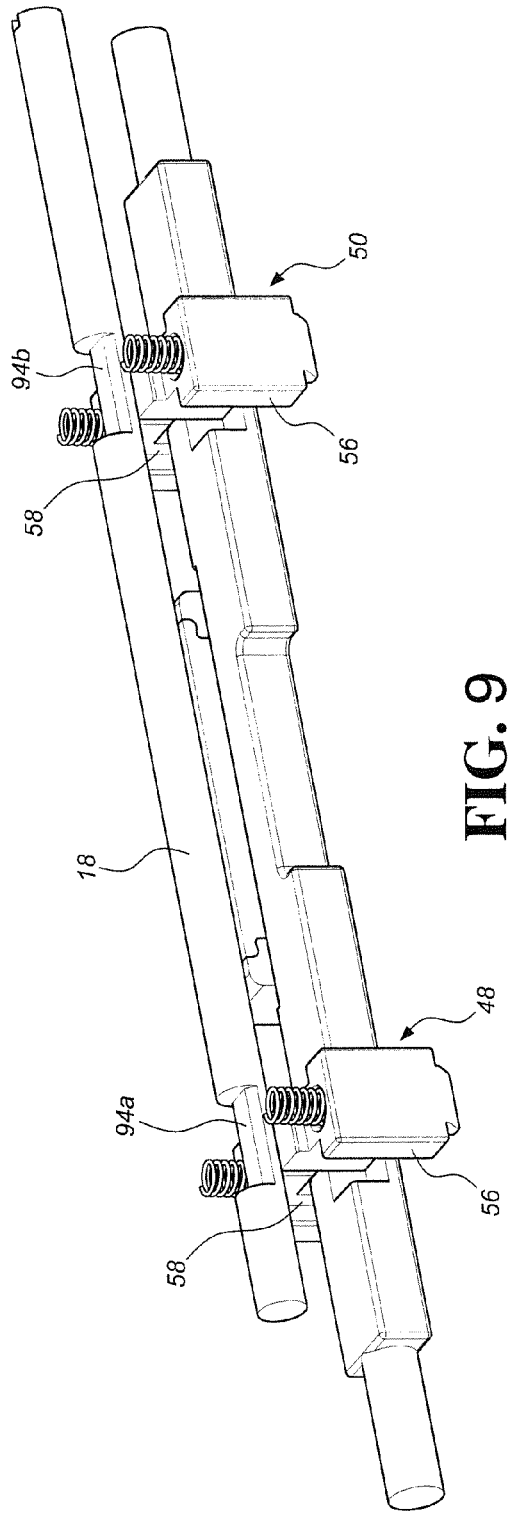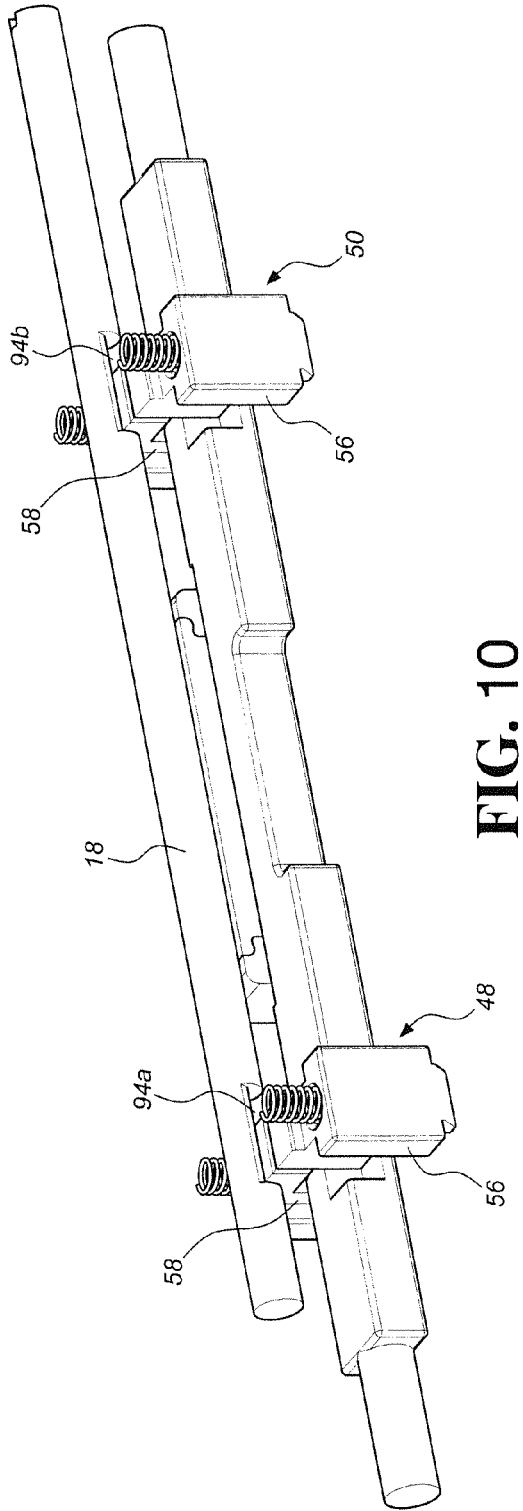

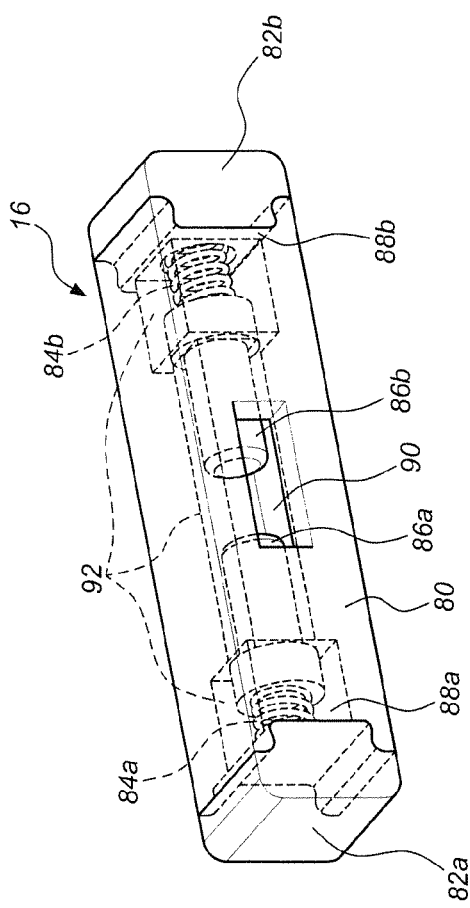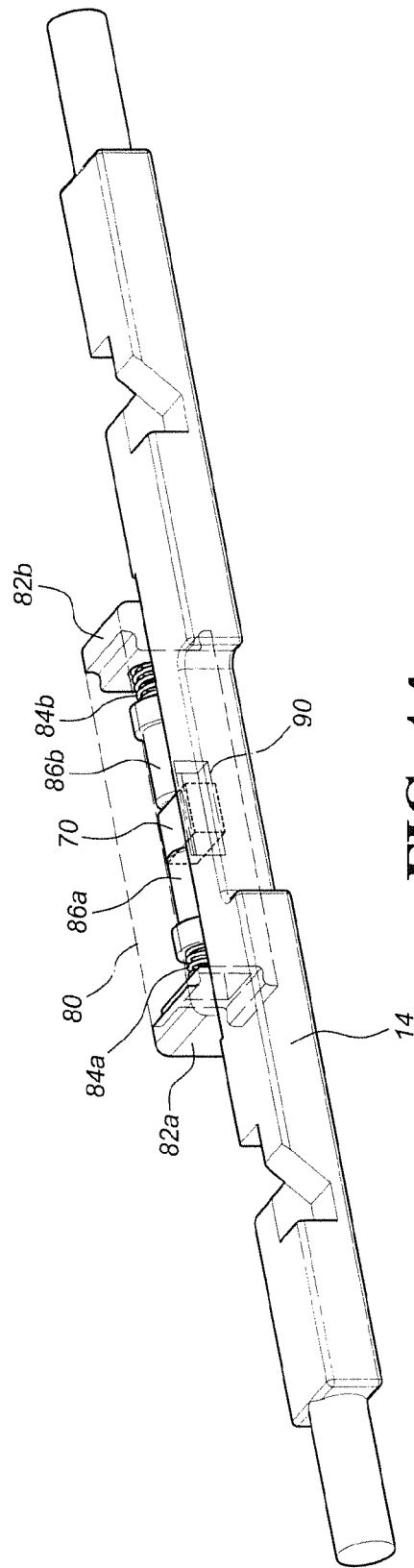
FIG. 13
FIG. 14

LOCKING DEVICE FOR CASE OF PORTABLE ELECTRONIC DEVICE

FIELD OF THE INVENTION

The present invention relates to a locking device, and more particularly, to a locking device for a replaceable case of a portable electronic device.

BACKGROUND OF THE INVENTION

The electronic devices such as cellular phones, PDAs, GPSs, electronic reading devices and different types of intelligent phones become necessary equipment for almost every person. The aesthetic outer appearances attract the users' attentions directly by its color, texture and patterns. The outer appearance shows the personality of the user. However, the users cannot change the outer appearances of the electronic devices easily because the shape, the colors and the patterns are integral to the casing. Therefore, replaceable cases are developed to allow the users to change the casings as desired.

The applicant has filed an EP 2180668 B1 which is referenced for understanding the present application.

The EP 2180668 B1 provides the replaceable case, however, the case cannot be locked so that the case might be separated by improper operation and/or impact, such as the devices drop on the ground and the case is separated from the phone. Therefore, the present invention provides a locking device for secure the case to the electronic device.

The present invention intends to provide a locking device which improves the shortcomings of the conventional replaceable case and ensures that the case is secured to the electronic device.

SUMMARY OF THE INVENTION

The present invention relates to a locking device for a case of a portable electronic device and comprises a body having a top, a bottom, a left side and a right side. The top has a first installation portion and the bottom located corresponding to the top. The bottom has an installation area which has a locking room. A first part has a first top installation portion and a first bottom installation portion, wherein the first top installation portion is located corresponding to the first installation portion of the body and the first bottom installation portion is located corresponding to the installation area of the body. A first engaging unit is installed to the installation area of the body and has a fixing part, a fixing member, a first engaging member and a first resilient member. The fixing part has a first hole and is connected to the fixing member. The first engaging member extends through the first hole of the fixing part. The first resilient member is located between the first engaging member and the fixing member so as to provide a resilient force to the first engaging member to protrude a portion of the first engaging member through the first hole of the fixing part. A link is movably located in the installation area of the body and reaches to the first engaging unit. The link has a first guide portion which has a first guide section located corresponding to the first engaging member. A locking member is pivotably located in the installation area of the body and reaches the first engaging unit. The locking member has a first recess and an operation end. The first recess is located corresponding to the first engaging member of the first engaging unit so that the first engaging member is movable in the first recess. The first part is connected to the body by engagement of the first engaging member and the first bottom installation portion. When the locking member is rotated and the first recess is located away from the first engaging member, the locking member contacts the first engaging member.

Preferably, the installation area of the body has a first chamber, a second chamber, a mediate chamber and a path. The first chamber accommodates the first engaging unit. The mediate chamber is located between the first and second chambers. The link is movably located in the path which communicates with the first chamber, the second chamber and the mediate chamber. The path extends through the left side and the right side of the body.

Preferably, the link has a protrusion and a return unit is located in the mediate chamber. The return unit has a base, a first stop, a second stop, a first spring, a second spring, a first contact member and a second contact member. The base has a first end, a second end, an elongate hole and a room which communicates with the elongate hole. The second end is located corresponding to the first end. The elongate hole is located between the first and second ends, and corresponding to the protrusion of the link. A length of the elongate hole is larger than a width of the protrusion so that the protrusion is movable in the elongate hole. The first stop and the second stop are respectively fixed to the first and second ends of the base. The first spring and the first contact member are located in the room of the base. The first spring is located between the first stop and the first contact member. The first contact member is biased by the first spring. The second spring and the second contact member are located in the room of the base. The second spring is located between the second stop and the second contact member. The second contact member is biased by the second spring. The first and second contact members contact the protrusion.

Preferably, a cover is mounted to the installation area of the body.

Preferably, a second engaging unit is located in the second chamber of the body.

Preferably, the locking member has a second recess which is located corresponding to the second engaging unit. The second engaging unit is movable relative to the second recess.

Preferably, the base has a first opening unit which provides a push force relative to the first part. When the first part is released from the body, the push force of the first opening unit separates the first part from the body.

Preferably, the axis of the locking member is parallel to the link and the first engaging unit defines a first slot. The locking member extends through the first slot and contacts a wall of the first slot. The locking member is maintained at a position in the locking room by the contact with the wall of the first slot.

Preferably, a second part has a second top installation portion and a second bottom installation portion. The body has a second installation portion at the top thereof. The second top installation portion is located corresponding to the second installation portion of the body. The second bottom installation portion is located corresponding to the first engaging unit. The fixing part has a second hole. The first engaging unit has a second engaging member and a second resilient member which biases the second engaging member. A portion of the second engaging member extends from the second hole of the fixing part so as to be engaged with the second bottom installation portion of the second part.

Preferably, the first guide portion of the link has a second guide section which is located corresponding to the second engaging member of the first engaging unit.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 9 shows that the engaging unit is locked by the locking member;

FIG. 10 shows that the locking member releases the locked status of the engaging unit;

FIG. 13 shows the returning unit of the present invention, and

FIG. 14 shows the returning unit and the link of the present invention.

DETAILED DESCRIPTION OF THE PREFERRED EMBODIMENT

Figure 1:
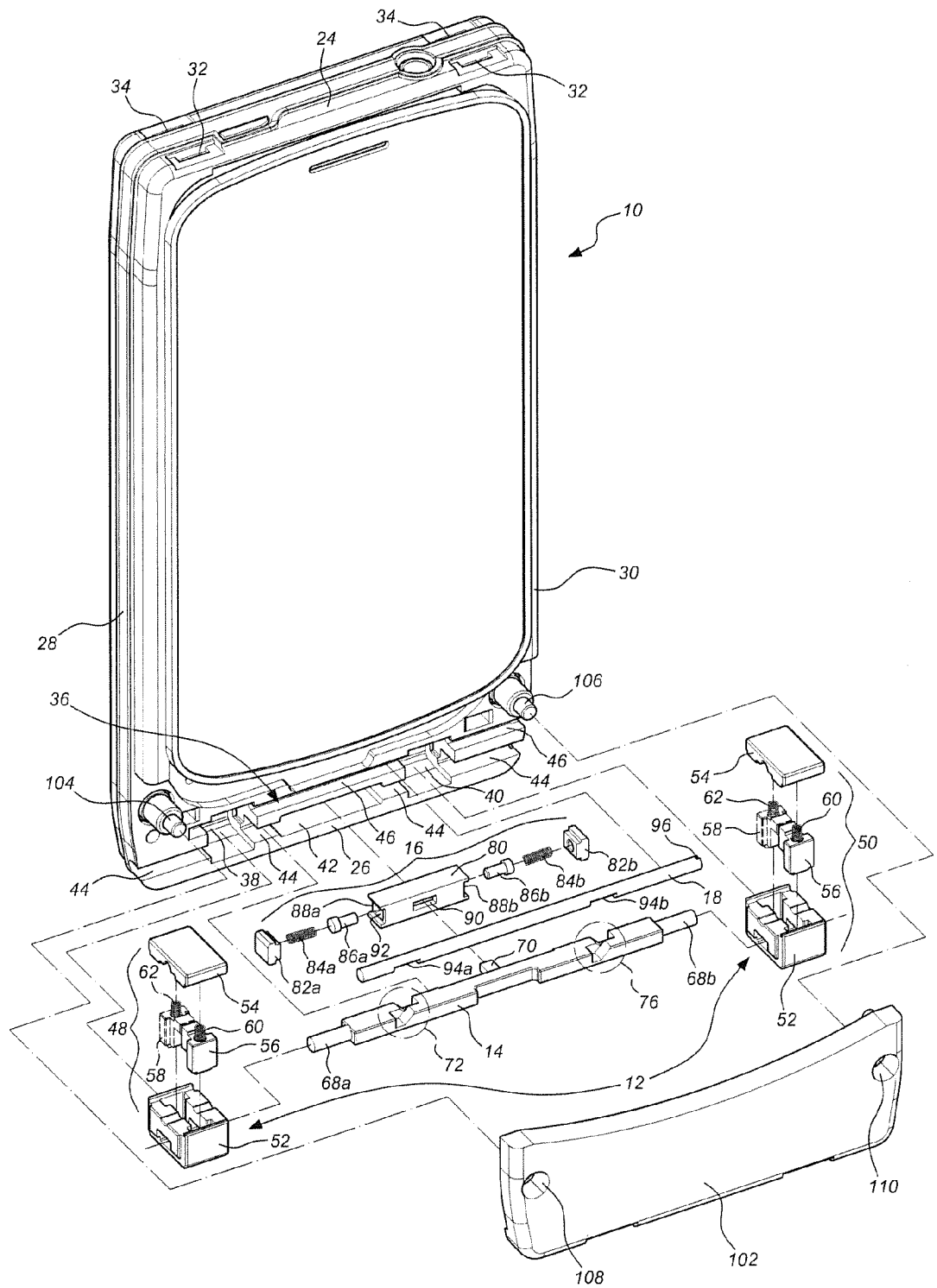
FIG. 1 is an exploded view to show the locking device of the present invention.
Figure 2:
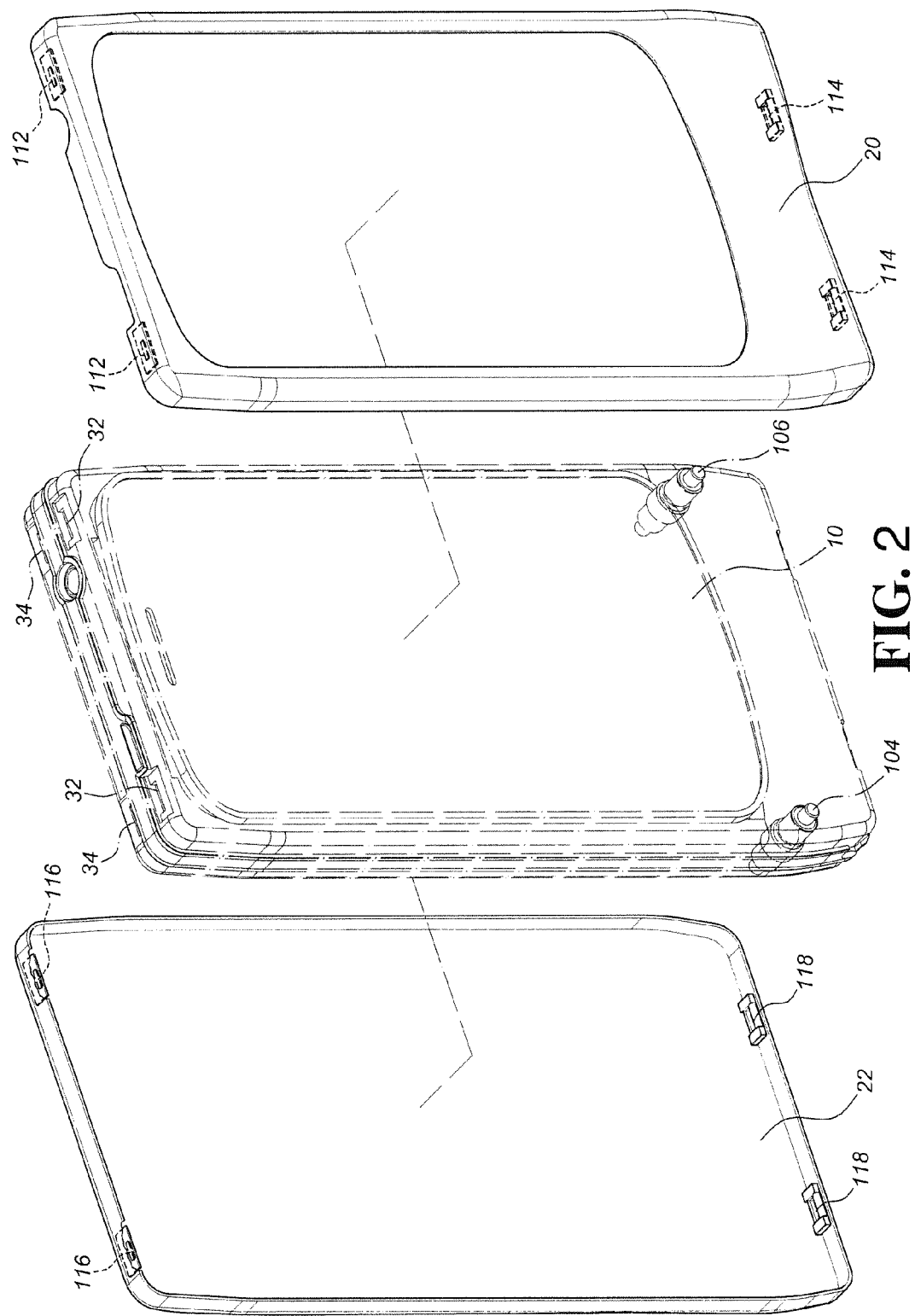
FIG. 2 is a perspective view to show the first and second parts and the body of the electronic device.

Referring to FIG. 1, the locking device for a replaceable case of a portable electronic device of the present invention comprises a body 10, an engaging assembly 12, a link 14, a return unit 16 and a locking member 18. By the locking device, as shown in FIG. 2, a first part 20 and a second part 22 are connected to the front and rear sides of the body 10.

The body 10 has a top 24, a bottom 26, a left side 28 and a right side 30, wherein the top 24 has one or a pair of first installation portions 32 and one or a pair of second installation portions 34. The bottom 26 is located corresponding to the top 24, and has an installation area 36 which has a first chamber 38, a second chamber 40, a mediate chamber 42, a path 44 and a locking room 46. The mediate chamber 42 is located between the first and second chambers 38, 40. The path 44 communicates with the first chamber 38, the second chamber 40 and the mediate chamber 42. The path 44 extends through the left side 28 and the right side 30 of the body 10. The opening of the locking room 46 is located corresponding to one of the left side 28 and the right side 30 of the body 10. In this embodiment, the opening of the locking room 46 is located corresponding to the right side 30 of the body 10.

Figure 3:
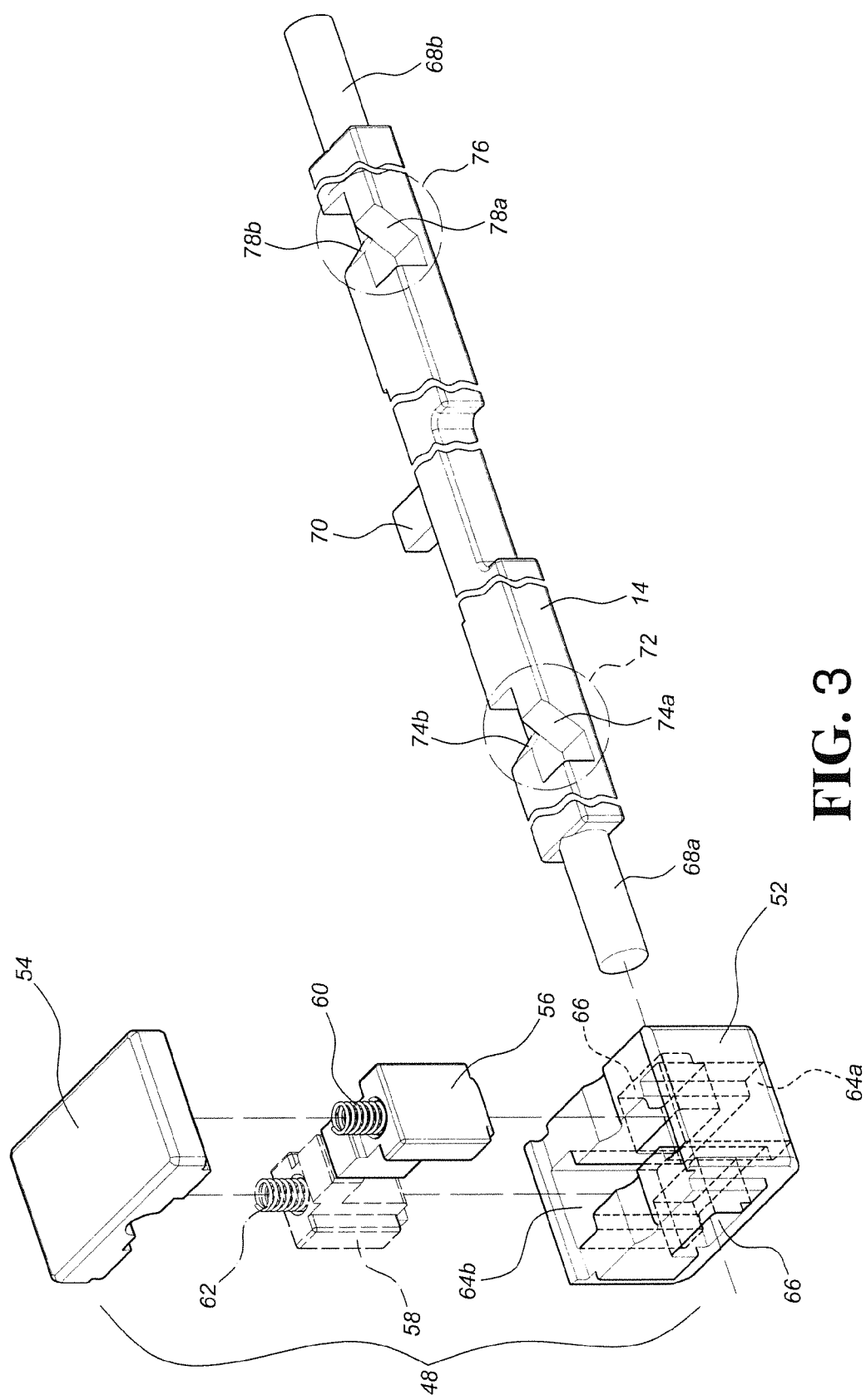
FIG. 3 is an exploded view of the link and the first engaging unit of the present invention.

The engaging assembly 12 has a first engaging unit 48 and a second engaging unit 50, wherein the second engaging unit 50 and the first engaging unit 48 have the identical structure so that only the first engaging unit 48 is described and the same parts of the two engaging units use the same numerals. In this embodiment, the first engaging unit 48 is installed to the first chamber 38 of the installation area 36 of the body 10 and has a fixing part 52, a fixing member 54, a first engaging member 56, a second engaging member 58, a first resilient member 60 and a second resilient member 62. Referring to FIG. 3, the fixing part 52 has a first hole 64a, a second hole 64b and a transverse hole 66. Preferably, the first and second holes 64a, 64b are located in the direction perpendicular to the transverse hole 66. The first engaging member 56 extends through the first hole 64a and the second engaging member 58 extends through the second hole 64b. A portion of the link 14 extends through the transverse hole 66. The fixing part 52 is connected to the fixing member 54. The first resilient member 60 is located between the first engaging member 56 and the fixing member 54 so as to provide a resilient force to the first engaging member 56 to protrude a portion of the first engaging member 56 through the first hole 64a of the fixing part 52. The second resilient member 62 biases the second engaging member 58 so that a portion of the second engaging member 58 protrudes out from the second hole 64b of the fixing part 52. The second engaging unit 50 is located in the second chamber 40 of the body 10.

The link 14 is movably located in the path 44 of the installation area 36 of the body 10 and reaches the first and second engaging units 48, 50. The link 14 has a first end 68a, a second end 68b, a protrusion 70 and a first guide portion 72. As shown in FIG. 3, the second end 68b is located corresponding to the first end 68a, and the protrusion 70 is located between the first and second ends 68a, 68b. The first guide portion 72 has a first guide section 74a and a second guide section 74b. The first guide section 74a is located corresponding to the first engaging member 56 of the first engaging unit 48. The second guide section 74b is located corresponding to the second engaging member 58 of the first engaging unit 48. The link 14 has a second guide portion 76 which has a first guide section 78a and a second guide section 78b. The first guide section 78a is located corresponding to the first engaging member 56 of the second engaging unit 50. The second guide section 78b is located corresponding to the second engaging member 58 of the second engaging unit 50.

The return unit 16 is located in the mediate chamber 42 and has a base 80, a first stop 82a, a second stop 82b, a first spring 84a, a second spring 84b, a first contact member 86a and a second contact member 86b. The base 80 has a first end 88a, a second end 88b, an elongate hole 90 and a room 92 which communicates with the elongate hole 90. The second end 88b is located corresponding to the first end 88a. The elongate hole 90 is located between the first and second ends 88a, 88b, and corresponding to the protrusion 70 of the link 14.

Figure 4:
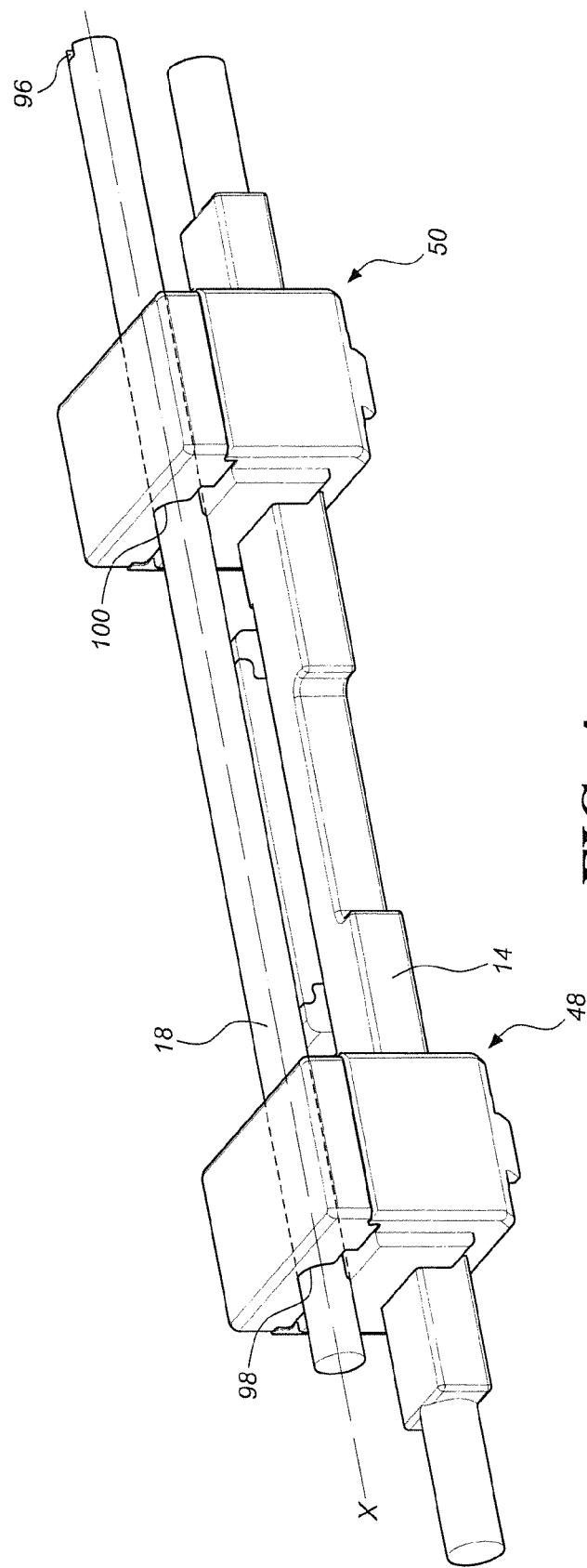
FIG. 4 is a perspective view to show the locking member extends through the first and second engaging units of the present invention.
Figure 5:
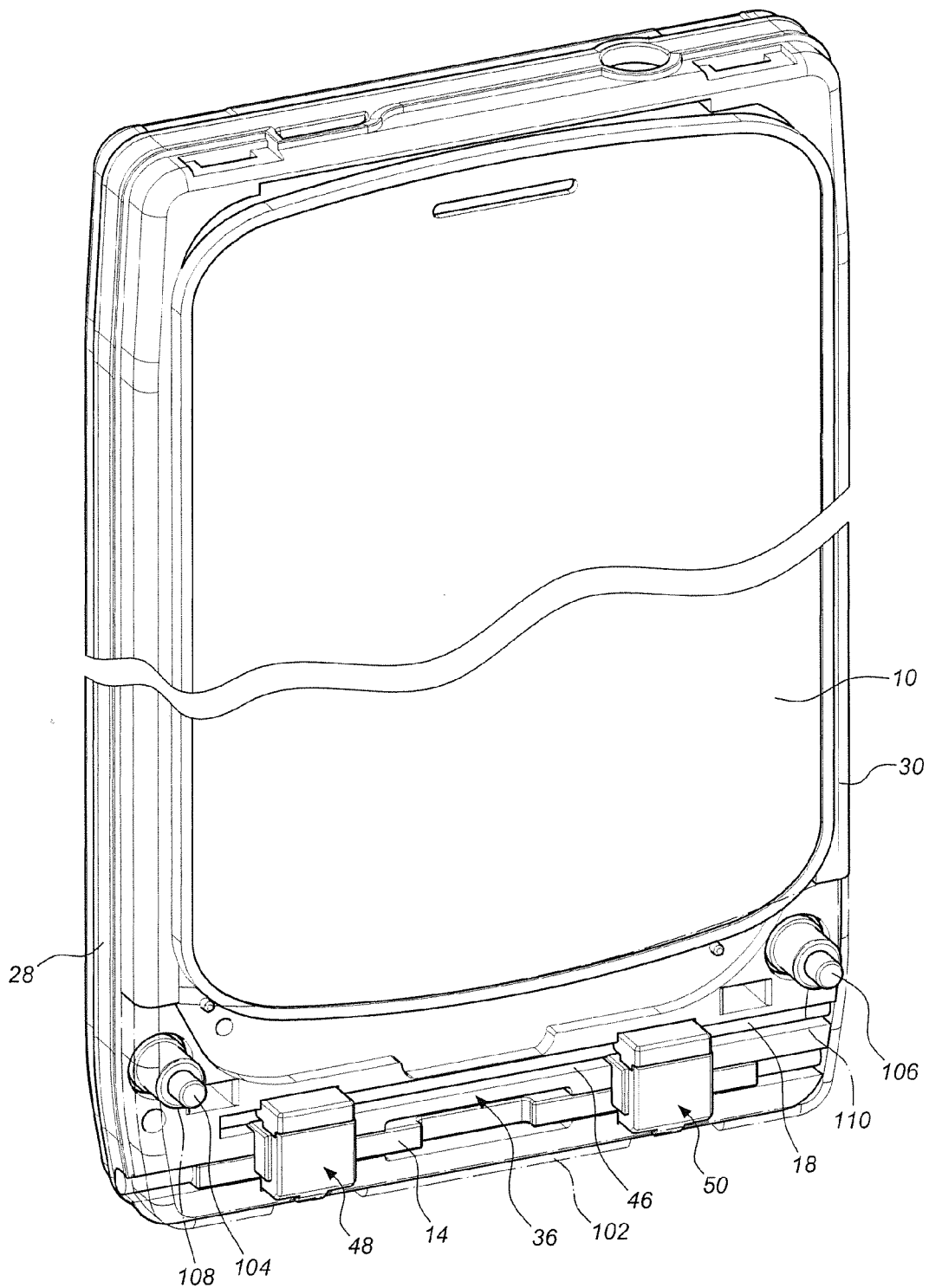
FIG. 5 is a perspective view to show the case connected to the electronic device.

The locking member 18 is pivotably located in the installation area 36 of the body 10 and reaching to the first engaging unit 48 and the second engaging unit 50. The locking member 18 has a first recess 94a, a second recess 94b and an operation end 96. The first recess 94a is located corresponding to the first engaging member 56 and the second engaging member 58 of the first engaging unit 48. The second recess 94b is located corresponding to the first and second engaging members 56, 58 of the second engaging unit 50. The operation end 96 is located corresponding to the right side 30 of the body 10. As shown in FIGS. 4 and 5, the axis X of the locking member 18 is parallel to the link 14. The first and second engaging units 48, 50 respectively define a first slot 98 and a second slot 100. The locking member 18 extends through the first and second slots 98, 100, and contacts at least one wall of the first and second slots 98, 100. The locking member 18 is maintained at a position in the locking room 46 by the contact with the at least one wall of the first and second slots 98, 100. In addition, the operation end 96 has a groove for convenience of engagement with screw drivers to operate the operation end 96 and to rotate the locking member 18.

As shown in FIGS. 1 and 5, a cover 102 is mounted to the installation area 36 of the body 10 so as to cover the parts of the locking mechanism. In another embodiment, a first opening unit 104 and a second opening unit 106 are respectively installed to the left side 28 and the right side 30 of the body 10. The cover 102 has two holes 108, 110 so that the first and second opening units 104, 106 partially protrude therefrom.

As shown in FIG. 2, the first part 20 has at least one first top installation portion 112 or a pair of first top installation portions 112, and one first bottom installation portion 114 or a pair of first bottom installation portions 114. The first top installation portion 112 is located corresponding to the first installation portion 32 of the body 10 and the first bottom installation portion 114 is located corresponding to the installation area 36 of the body 10. The first part 20 is connected to the body 10 by the first top and bottom installation portions 112, 114.

Figure 6:
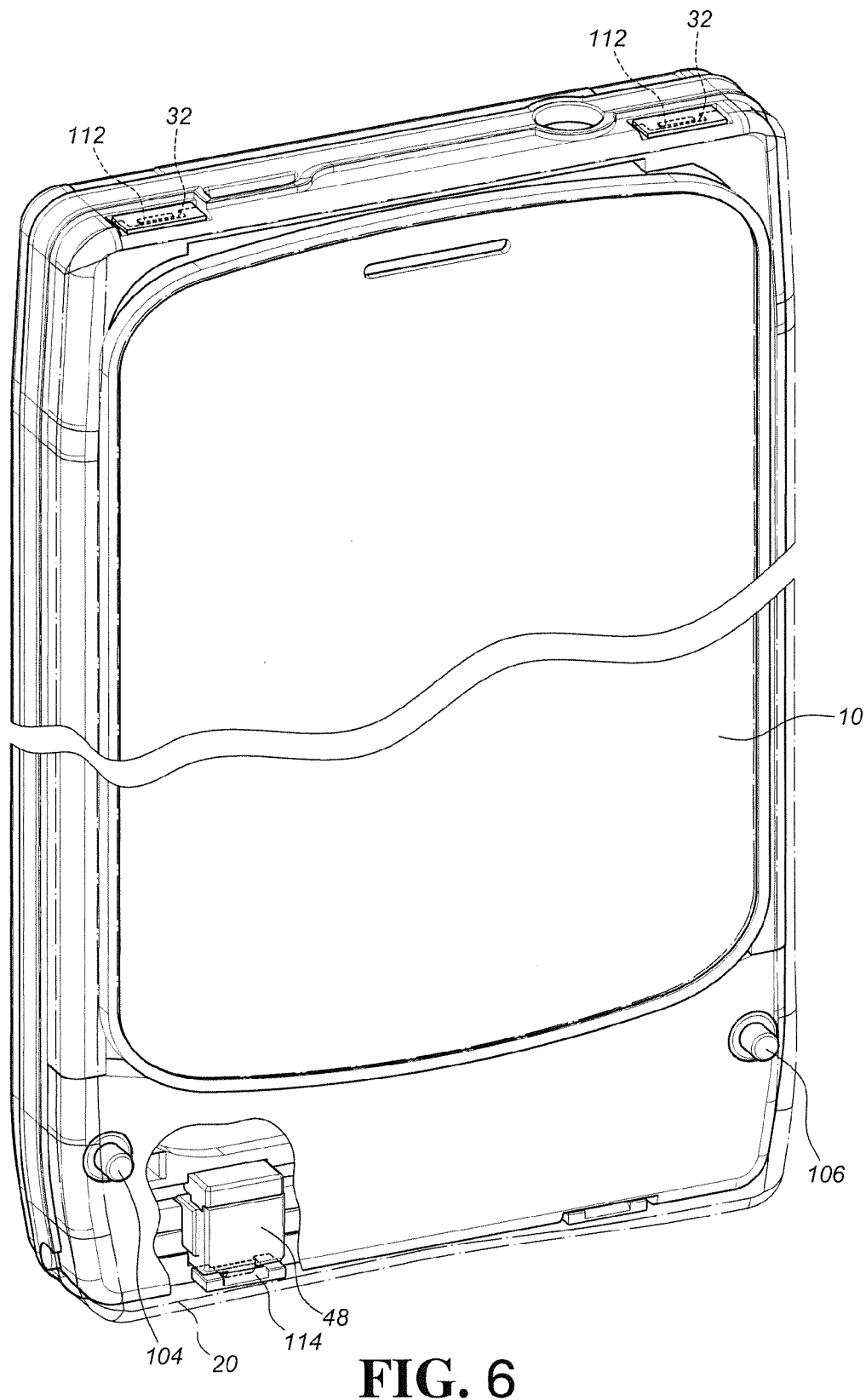
FIG. 6 is an exploded view to show the first part and the body of the present invention.
Figure 7:
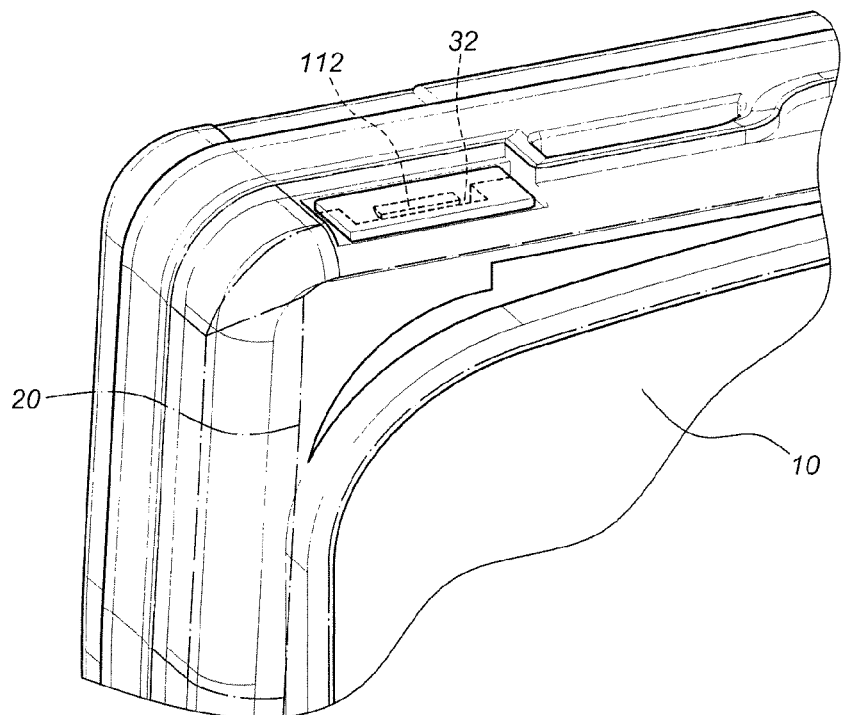
FIG. 7 is an enlarged view to show the first part connected to the top of the body.
Figure 8:
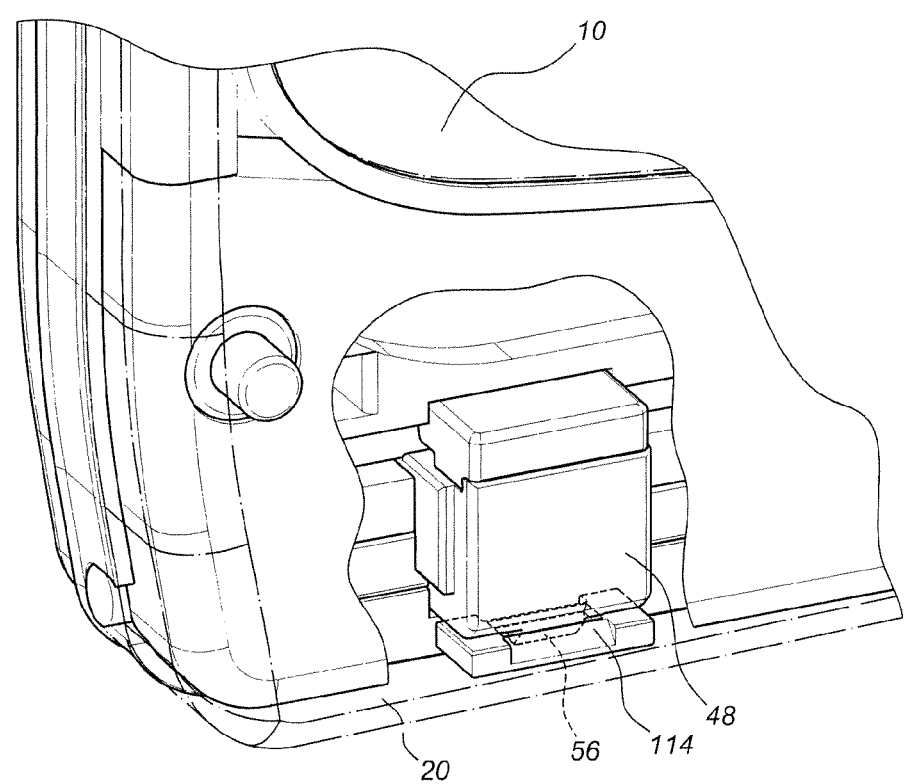
FIG. 8 is an enlarged view to show the first part connected to the bottom of the body.

The second part 22 has at least one second top installation portion 116 or a pair of second top installation portions 116, and one second bottom installation portion 118 or a pair of second bottom installation portions 118. The second top installation portion 116 is located corresponding to the second installation portion 34 of the body 10 and the second bottom installation portion 118 is located corresponding to the installation area 36 of the body 10. As shown in FIGS. 6 to 8, the first part 20 is connected to the body 10 by the engagement between the first installation portion 32 of the body 10 and the first top installation portion 112, and the engagement between the first bottom installation portion 114 and the first engaging member 56 of the first engaging unit 48 of the body 10. The second part 22 is connected to the body 10 by the connection of the second top and bottom installation portions 116, 118 to the body 10, and the engagement is the same as that of the first part 20.

Referring to FIGS. 2 and 6, the opening units 104, 106 provide a push force when the first part 210 is connected to the body 10 so that when the first part 20 is released from the body 10, the first opening unit 104 or the second opening units 106 pushes the first part 20 to be separated from the body 10.

FIG. 9 shows that the first recess 94a of the locking member 18 is located away from the first and second engaging members 56, 58 of the first engaging unit 48, and the second recess 94b of the locking member 18 is located away from the first and second engaging members 56, 58 of the second engaging unit 50. Therefore, the first and second engaging members 56, 58 of the first and second engaging units 48, 50 are restricted by the locking member 18 and cannot be moved. Furthermore, by the restriction to the first and second engaging members 56, 58 of the first and second engaging units 48, 50, the first and second parts 20, 22 are secured to the body 10.

FIG. 10 shows that the locking member 18 is rotated an angle and the first recess 94a of the locking member 18 is located corresponding to the first and second engaging members 56, 58 of the first engaging unit 48 so as to provide a room for movement, and, the second recess 94b is located corresponding to the first and second engaging members 56, 58 of the second engaging unit 50 so as to provide a room for movement.

Figure 11:
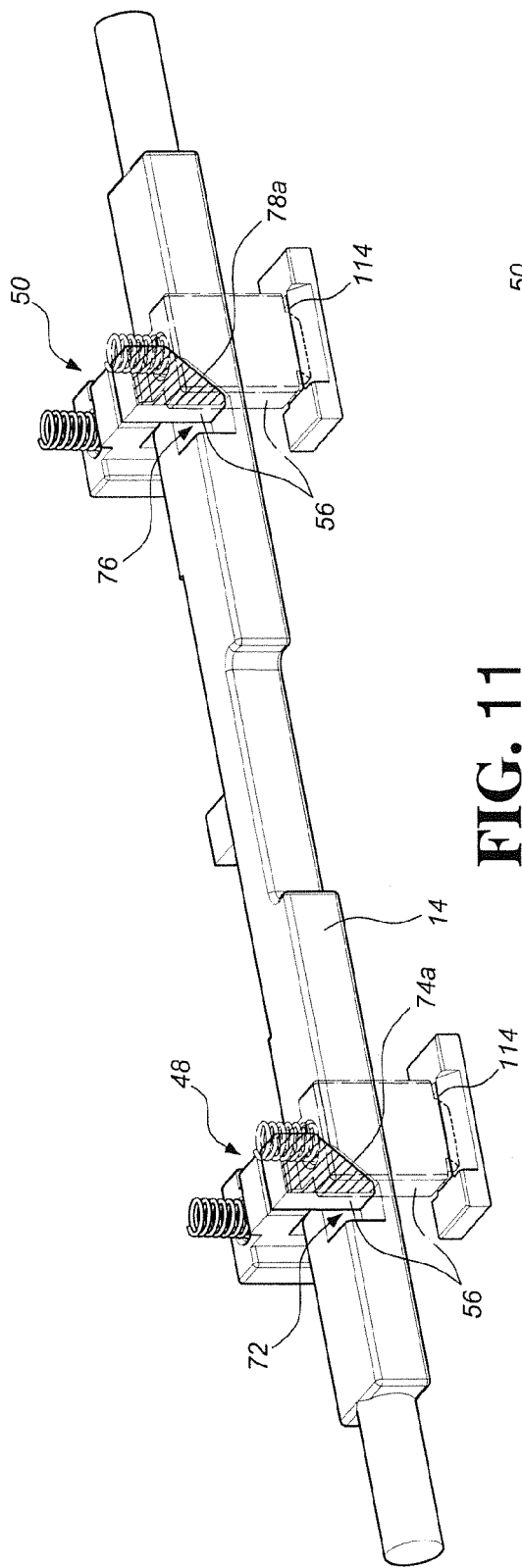
FIG. 11 shows that the engaging unit is not yet moved by the link and the engaging unit is connected to the first bottom installation portion.

FIG. 11 shows that the link 14 is not yet moved relative to the first and second engaging units 48, 50, the first guide section 74a of the first guide portion 72 is located corresponding to the first engaging member 56 of the first engaging unit 48, and the first guide section 78a of the second guide portion 76 is located corresponding to the first engaging member 56 of the second engaging unit 50. The first engaging members 56 of the first and second engaging units 48, 50 are connected to the first bottom installation portion 114 of the first part 20.

Figure 12:
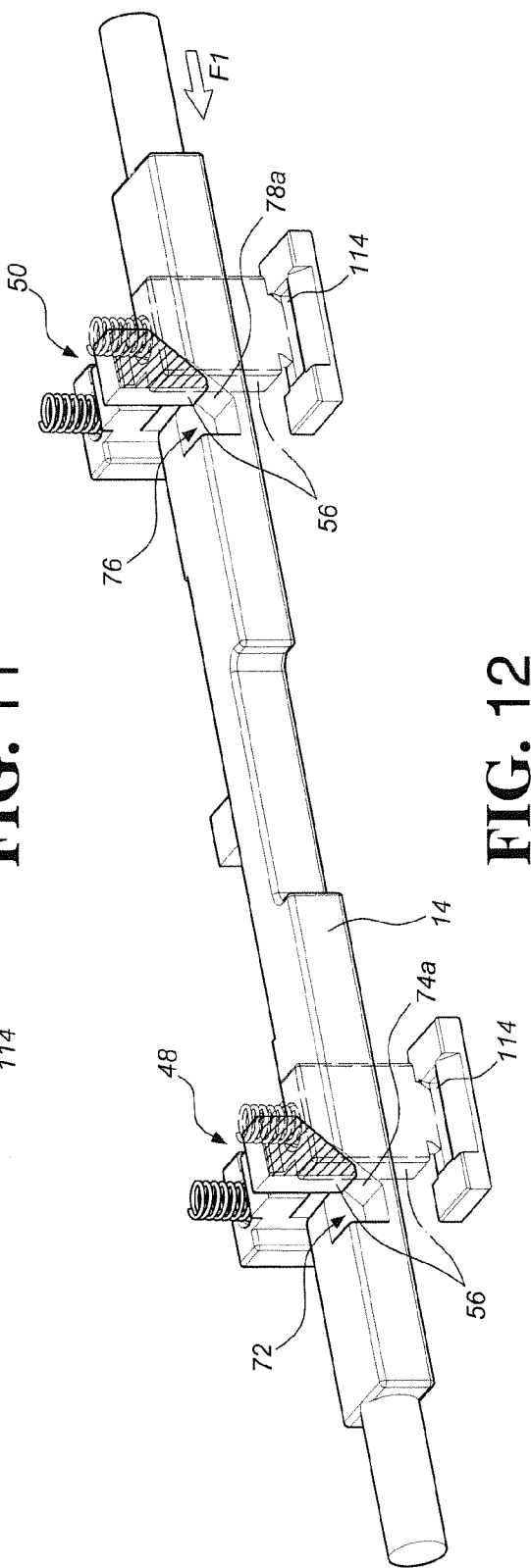
FIG. 12 shows that the engaging unit is moved by the link and the engaging unit is released from the first bottom installation portion.

When the locking member 18 is rotated an angle as shown in FIG. 10, the link 14 is moved in the direction F1 relative to the first and second engaging units 48, 50. As shown in FIG. 12, the first engaging member 56 of the first engaging unit 48 is pushed and moved by the first guide section 74a of the first guide portion 72 of the link 14. The first engaging member 56 of the second engaging unit 50 is moved by the first guide section 78a of the second guide portion 76 of the link 14. The first engaging members 56 of the first and second engaging units 48, 50 are released from the first bottom installation portion 114 of the first part 20 to release the locked status.

FIGS. 13 and 14 show that the length of the elongate hole 90 of the base 80 of the return unit 16 is larger than the width of the protrusion 70 so that the protrusion 70 is movable in the elongate hole 90. The first stop 82a and the second stop 82b are respectively fixed to the first and second ends 88a, 88b of the base 80. The first spring 84a and the first contact member 86a are located in the room 92 of the base 80. The first spring 84a is located between the first stop 82a and the first contact member 86a. The first contact member 86a is biased by the first spring 84a. The second spring 84b and the second contact member 86b are located in the room 92 of the base 80. The second spring 84b is located between the second stop 82b and the second contact member 86b. The second contact member 86b is biased by the second spring 84b. The first and second contact members 86a, 86b contact the protrusion 70. When the force applied to the link 14 is released, the link 14 returns to its original position by the return unit 16.

While we have shown and described the embodiment in accordance with the present invention, it should be clear to those skilled in the art that further embodiments may be made without departing from the scope of the present invention.

What is claimed is:
1. A locking device comprising:
a body having a top, a bottom, a left side and a right side, the top having a first installation portion and the bottom located corresponding to the top, the bottom having an installation area which has a locking room;
a first part having a first top installation portion and a first bottom installation portion, the first top installation portion located corresponding to the first installation portion of the body and the first bottom installation portion located corresponding to the installation area of the body;
a first engaging unit installed to the installation area of the body and having a fixing part, a fixing member, a first engaging member and a first resilient member, the fixing part having a first hole and connected to the fixing member, the first engaging member extending through the first hole of the fixing part, the first resilient member located between the first engaging member and the fixing member so as to provide a resilient force to the first engaging member to protrude a portion of the first engaging member through the first hole of the fixing part;
a link movably located in the installation area of the body and reaching to the first engaging unit, the link having a first guide portion which has a first guide section located corresponding to the first engaging member, and
a locking member pivotably located in the installation area of the body and reaching the first engaging unit, the locking member having a first recess and an operation end, the first recess located corresponding to the first engaging member of the first engaging unit so that the first engaging member is movable in the first recess;

wherein, the first part is connected to the body by engagement of the first engaging member and the first bottom installation portion;

wherein, when the locking member is rotated and the first recess is located away from the first engaging member, the locking member contacts the first engaging member.

2. The device as claimed in claim 1, wherein the installation area of the body has a first chamber, a second chamber, a mediate chamber and a path, the first chamber accommodates the first engaging unit, the mediate chamber is located between the first and second chambers, the link is movably located in the path which communicates with the first chamber, the second chamber and the mediate chamber, the path extends through the left side and the right side of the body.

3. The device as claimed in claim 2, wherein the link has a protrusion and a return unit is located in the mediate chamber, the return unit has a base, a first stop, a second stop, a first spring, a second spring, a first contact member and a second contact member, the base has a first end, a second end, an elongate hole and a room which communicates with the elongate hole, the second end is located corresponding to the first end, the elongate hole is located between the first and second ends and corresponding to the protrusion of the link, a length of the elongate hole is larger than a width of the protrusion so that the protrusion is movable in the elongate hole, the first stop and the second stop are respectively fixed to the first and second ends of the base, the first spring and the first contact member are located in the room of the base, the first spring is located between the first stop and the first contact member, the first contact member is biased by the first spring, the second spring and the second contact member are located in the room of the base, the second spring is located between the second stop and the second contact member, the second contact member is biased by the second spring, the first and second contact members contact the protrusion.

4. The device as claimed in claim 2, further comprising a cover mounted to the installation area of the body.

5. The device as claimed in claim 2, further comprising a second engaging unit located in the second chamber of the body.

6. The device as claimed in claim 5, wherein the locking member has a second recess which is located corresponding to the second engaging unit, the second engaging unit is movable relative to the second recess.

7. The device as claimed in claim 1, wherein the base has a first opening unit which provides a push force relative to the first part, when the first part is released from the body, the push force of the first opening unit separates the first part from the body.

8. The device as claimed in claim 1, wherein an axis of the locking member is parallel to the link and the first engaging unit defines a first slot, the locking member extends through the first slot and contacts a wall of the first slot, the locking member is maintained at a position in the locking room by a contact with the wall of the first slot.

9. The device as claimed in claim 1, further comprising a second part which has a second top installation portion and a second bottom installation portion, wherein the body has a second installation portion at the top thereof, the second top installation portion is located corresponding to the second installation portion of the body, the second bottom installation portion is located corresponding to the first engaging unit, the fixing part has a second hole, the first engaging unit has a second engaging member and a second resilient member which biases the second engaging member, a portion of the second engaging member extends from the second hole of the fixing part so as to be engaged with the second bottom installation portion of the second part.

10. The device as claimed in claim 9, wherein the first guide portion of the link has a second guide section which is located corresponding to the second engaging member of the first engaging unit.

* * * * *